Aug. 18, 1942.  P. J. DORR  2,293,197
DETACHABLE GEAR SHIFT LEVER AND LOCK
Filed June 28, 1941   2 Sheets-Sheet 1
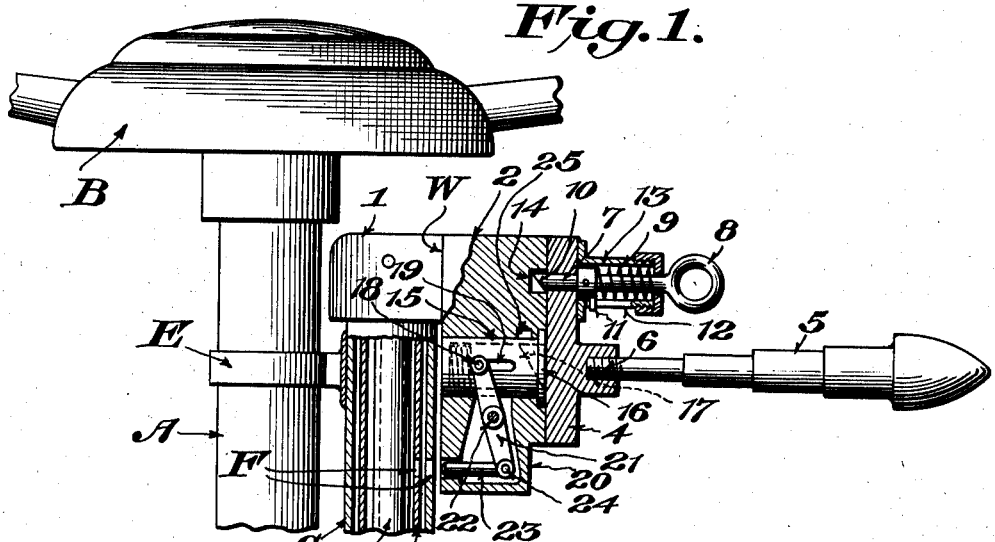
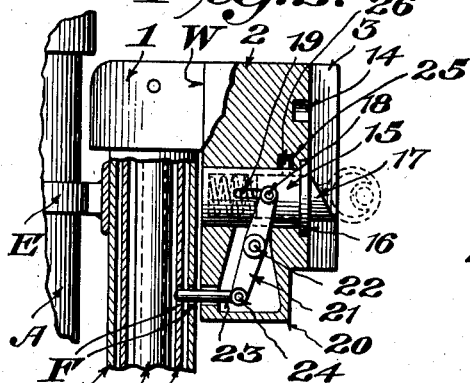 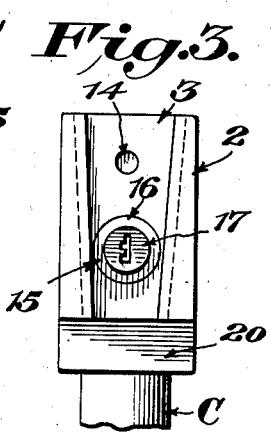 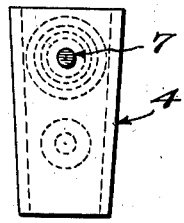
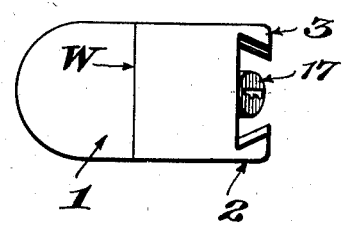
Inventor
Paul J. Dorr,
By Riess & Geier
Attorneys

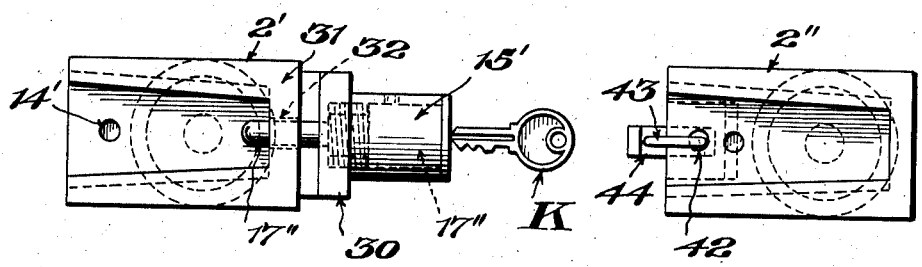
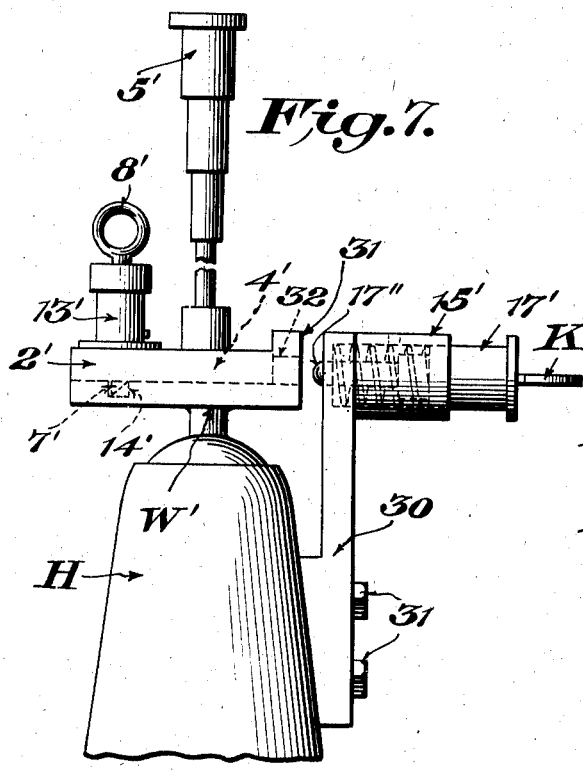
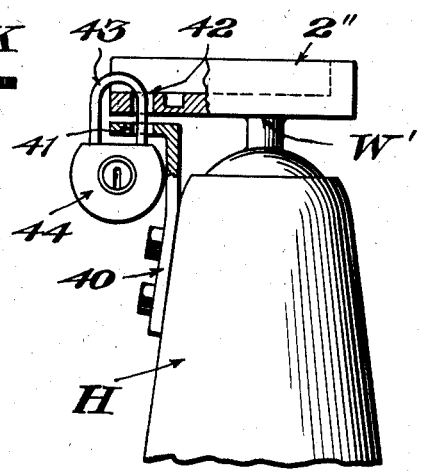

Patented Aug. 18, 1942

2,293,197

UNITED STATES PATENT OFFICE 2,293,197

DETACHABLE GEARSHIFT LEVER AND LOCK

Paul J. Dorr, Washington, D. C.

Application June 28, 1941, Serial No. 400,338

15 Claims. (Cl. 70—204)

This invention relates to a detachable gear shift lever and lock for motor vehicles, which upon detachment of the lever renders the gear shift ineffective, and also a lock which upon detachment of the gear shift lever is operable to prevent reattachment of a lever capable of actuation of the gear shift; and also effects locking of the gear shifting mechanism.

The primary object of the invention is to provide an improved detachable gear shift lever, which upon removal, affords every safeguard against the use of a dummy or other substitute lever, generally, or broadly akin to the use of the well known skeleton key, to operate the gear shift in any attempt of theft of the vehicle.

The invention further aims to provide a detachable gear shift lever of the type just mentioned which is applicable to either the floor type of gear shift mechanism, that is operated by a vertical handle extending upwardly from the floor, or to a more recent or present-day type wherein the gear shift mechanism is operated by a substantially horizontally disposed lever located below and in close proximity to the usual steering wheel.

More particularly the invention, in one of its aspects, embodies a key-controlled lock which has a bolt that when the lock is operative, blocks the application to the gear shift mechanism of any and all types of levers, capable of operating the gear shift, until the bolt is retracted, so that even were the lever with which the car is equipped be stolen, or the use of another attempted, same could not be operatively applied until release of the lock.

Further, the invention aims to provide a key-operated or key controlled lock which functions in a dual manner, namely to not only block the application of the lever to the gear shift mechanism but to also lock the latter, thus affording a double safeguard, i. e., even though the lock is jimmied, or otherwise surreptitiously released in an attempt at theft, and the bolt thus rendered inoperative; by providing a locking structure having a special type of lever, which is required to effect operation of the gear shift mechanism, thereby to prevent its operation by any attempted substitution of a dummy or other lever for the original one.

Still further, the invention aims to provide a lock bolt which not only blocks the lever application, but also simultaneously effects locking of the gear shifting mechanism in a single operation.

The invention also aims to provide a lock, the bolt of which when unlocked, is automatically moved to unlock the gear shift mechanism by the replacement of the detached lever.

The invention further aims to provide a simple and economical locking structure, and one which is susceptible of easy and expeditious operation.

Still further the invention has for its object the provision of a compact locking structure embodying a minimum of parts capable of easy installation.

Further the invention aims to provide a device of the type set forth which may be built or originally incorporated in the motor vehicle during manufacture thereof so as to form a part thereof, in addition to being applicable to motor vehicles of the present day type.

The invention has still further and other objects which will be later set forth and of themselves manifested in the course of the following description.

In the drawings:

Fig. 1 is a view partly in vertical section of the invention applied to a certain type of gear shift which is operated from a point closely adjacent the steering wheel;

Fig. 2 is a like detailed view, showing the parts in locked position;

Fig. 3 is a front elevation of the keeper;

Fig. 4 is a like view of the lever supporting member;

Fig. 5 is a top plan view of the invention;

Fig. 6 is a top plan view of a modified form of the invention with the gear shift lever device removed, and the bolt in blocking position as applied to the housing of a gear shift mechanism of the floor type, shown in dotted lines;

Fig. 7 is a side elevation of Fig. 6, the housing partly broken away showing the invention in gear shift operating position;

Fig. 8 is a top plan view of a further modified form of the invention likewise applied to the housing of a gear shift mechanism of the floor type, shown in dotted lines; and Fig. 9 is a side elevation of Fig. 8 partly broken away and in section.

In the drawings, and referring to Figs. 1 to 5, A designates the usual steering wheel column of an automobile to which the steering wheel B, is attached. C indicates the column attached by bracket E to column A, column C forming a part of the gear shift mechanism that includes the member 1, shaft D, and sleeve C', the column C, and the sleeve C', merely modified to the extent of having lateral openings F, formed therein for a purpose later to be set forth. All of the foregoing elements form no part of the present invention; therefore the invention is applicable to all other known types of present day gear shifts, excepting as concerns the provision of an opening or openings F', as above described.

A keeper or supporting member 2 is suitably attached to the member 1, and is formed with a dove-tail or other specially formed way or keeper proper 3, to receive the complementary plate like support or member 4, to which the operating lever for the gear shift mechanism is attached, preferably by threads as indicated at 6.

The lever as shown in Fig. 1 is preferably of the telescoping type so that same upon removal from the member 4, may be telescoped to be conveniently carried in the pocket of the operator.

For the purpose of releasably connecting the lever carrier 4, to the member 2, a sliding latching bolt 7, is provided which has a finger engaging member 8, and which is tensioned by spring 9, the latching bolt being beveled as indicated at 10 and held against rotation by means of a pin 11 connected thereto, the pin operating in a slot 12, formed in a casing 13 through which the latching bolt slides and which houses spring 9, that encircles same. It will be noted that the inclined free end of the bolt extends downwardly and inwardly, and is formed to be received in a socket 14 formed in the keeper member 2.

A cylinder lock is provided which embodies a barrel or casing 15 preferably having a circular head 16 fixedly countersunk in the base of the key way 3, as clearly shown in Figs. 1 and 2, and has on its interior a sliding spring pressed blocking bolt 17 that is provided with a guide pin 18, which operates in a longitudinal slot 19, provided therefor in the barrel 15, and also a projectible pin 26.

The member 2 has a hollow extension 20 depending therefrom which forms a housing for the lower end of a lever 21, which is pivoted thereto at 22. The lower end of the lever has a sliding locking bolt 23 pivoted thereto at 24, which locking bolt operates in the openings F, while the upper end of the lever 21 is connected with guide pin 18 carried by blocking bolt 17 so as to be actuated by the latter.

The member 2 is further formed with a socket 25 to receive the pin 26 of the lock.

In applying the invention to automobiles not originally equipped therewith, the usual lever which is carried by the member 1, is removed or severed as by sawing, and the member 2, then welded to the member 1, along the line of cut, indicated at W in Figs. 1 and 2. In incorporating the invention in vehicles during manufacture thereof, the member 2 may be cast integral with member 1.

With the member 4 applied, in the position of Fig. 1 to the member 2, it will be apparent that the gear shift can be operated by the lever 5, which latter is a substitute for the severed lever originally attached to the member 1, as set forth in the foregoing.

The operator, prior to leaving the machine, retracts the latching bolt 7 by pulling outwardly on the handle 8, to release the member 4, whereupon the latter is moved upwardly and disengaged from the member 2. The operator then manipulates the key K, shown in dotted lines in Fig. 2, to lock blocking bolt 17, in the blocking position, shown in Fig. 2 and in such manipulation the pin 26 of the lock is actuated to enter the socket 25, whereby the blocking bolt 17 is held in its projected or blocking position.

By referring to Fig. 2 it will be seen that upon movement of the blocking bolt 17 to blocking position the lever 21 will simultaneously be rocked and the locking bolt 23 consequently moved into its locked position wherein same projects through the openings F, as shown in Fig. 2, thus locking the gear shift mechanism.

When the operator is ready to reoperate the vehicle he inserts the key K, to release the blocking bolt 17 and moves the pin 26, of the lock out of the socket 25, and reapplies member 4 in the position of Figure 1, whereupon the latching bolt 7 is moved by its spring 9 into the socket 14 of member 2. Due to the bevelling of the latching bolt 7 and blocking bolt 17, upon restoring by sliding the member 4 into position in the keeper 3, the blocking bolt 17 will be automatically moved to its retracted position as shown in Fig. 1, and the latching bolt 7 will simultaneously be moved outwardly and then restored by its spring 9 to its latched position in socket 14 as shown in Fig. 1.

The form of the invention depicted in Figs. 6-7 is applicable to the floor type of gear shift mechanism. Thus in Figs. 6 and 7, a bracket 30 is attached to the housing H of the gear shift mechanism by fastenings 31 which may be of well known types resisting removal by the use of a screw driver, or wrench or the like.

The bolt 17' of the lock, however, is reduced in diameter as shown at 17'', and its barrel 15' is secured at its inner end to the bracket 30. The keeper or supporting member 2' is generally like that shown in Figs. 1-5 excepting formed with a vertical projection 31 which is provided with an opening 32 through which the bolt 17' projects when in bolt blocking position as shown in Fig. 6, thus also locking the gear shift.

The supporting or carrier member 4' for the lever 5' is likewise like that shown in Figs. 1-5 and is provided with a latch bolt 7' having a finger engaging piece 8', the latch being received in an opening 14' provided therefor in the base of the keeper.

In applying the invention the usual lever is severed at a point close to the housing H, and the keeper or supporting member 2' then welded in position at the line W'. If the invention is to be originally incorporated in the vehicle, the bracket 30 and the member 2' may be cast integral with the elements to which they are connected. In operation when the parts are in the position of Fig. 7, the member 4' is held against movement in the keeper member 2' by the combined blocking and locking bolt 17', so that the gears can be freely shifted by operation of lever 5'. Upon release of the bolt 17' and removal of the member 4' and therewith lever 5' bolt 17' is moved to the blocking and locking position of Fig. 6, and locked in such position by manipulation of the key K, as described in the form of the invention shown in Figs. 1-5, thus preventing the member 4' and its lever 5' from being applied to operate the gear shift.

In Figs. 8 and 9 a modification of Figs. 6 and 7, is illustrated and which presents a simpler and more economical form of the invention. In this instance a substantially L-shaped bracket 40 is provided and attached to the housing H, and is provided with an opening 41 which registers with an opening 42 formed in the keeper or supporting member 2'', which openings are formed to receive a leg of the bow 43 of an ordinary padlock 44.

With the padlock in the position of Fig. 9, it will be apparent that same not only blocks connection of the member 4' of the lever 5', but in addition the gear shift mechanism is locked against movement. Likewise in this instance the bracket 40, and the keeper member 2", can in original installation, be cast integral with the parts to which they are connected.

It is further to be expressly understood that instead of providing the keeper with a dove-tail way, the way may be variously configured so as to require the use of a specially formed member 4 or 4' in order to fit the way to operate the gear shift mechanism.

In the lock depicted in Figs. 1–7 the means, i. e., the tumblers, pin 26, etc., controlled by the key for locking and unlocking are not shown, since they form no part of the present invention; it merely being a requisite that the bolt can be manipulated and positioned by operation of the key as specifically set forth in the foregoing.

It is therefore evidenced that the invention may be built in the motor vehicle during manufacture, so as to form a part thereof, and is also applicable to motor vehicles of the present day type, not having the present invention originally incorporated therein.

It is furthermore to be expressly understood that the means for locking the gear shift by the lock 23 and its associated parts in Figs. 1 to 5, can be omitted if desired, and further that the structures of Figs. 1–5 with the gear shift lock so omitted, can be applied to the vertical lever shown in Fig. 7, with the keeper in a horizontal position as shown therein.

It will be further understood that the invention is susceptible to such other changes, alterations or modifications as may fall within the spirit and scope of the invention as announced by the following claims.

What is claimed is:

1. A device for preventing operation of the gear shifting mechanism of a motor vehicle composed of supporting means for connection to the operating means of the gear shift mechanism to actuate the latter, a hand-operated lever, means to detachably connect the lever to the supporting means, and key controlled means having a part incorporated therewith and movable to lie in the path of movement of the lever in connecting the latter to the supporting means to block connection of the lever to the supporting means when the key controlled means is in locked position, and which part of the key controlled means upon unlocking is movable out of the path of the lever to permit the latter to be connected to the supporting means, and means to connect the key controlled means to a part of the gear shift mechanism.

2. A device for preventing operation of the gear shifting mechanism of a motor vehicle in accordance with claim 1, wherein there is means actuated by the key controlled means which upon movement of the latter to lever blocking position simultaneously effects locking of the gear shift mechanism.

3. A device for preventing operation of the gear shifting mechanism of a motor vehicle in acordance with claim 1, wherein the said part of the key controlled means incorporated therewith includes a bolt which in locked position projects into the path of movement of the lever in connecting same to the supporting means.

4. A device for preventing operation of the gear shifting mechanism of a motor vehicle in accordance with claim 1, wherein the said part of the key controlled means incorporated therewith includes a bolt which in locked position projects into the path of movement of the lever in connecting same to the supporting means, and wherein there is means operable by the bolt upon movement of the latter to lever blocking position to simultaneously lock the gear shift mechanism.

5. A device for preventing operation of the gear shifting mechanism of a motor vehicle in accordance with claim 1, wherein the supporting means has a vertically disposed keeper of preconfigured shape and wherein the lever is horizontally disposed and has complementary means engageable with the keeper.

6. A device for preventing operation of the gear shifting mechanism of a motor vehicle in accordance with claim 1, wherein there is supporting means for the key controlled means to mount the latter adjacent the base of the lever of a gear shift mechanism of the floor type.

7. A device for preventing operation of the gear shifting mechanism of a motor vehicle in accordance with claim 1, wherein the key controlled means consists of a padlock; wherein there is a member, formed with an opening to receive the bow of the padlock, mounted adjacent the base of the lever of a gear shift mechanism of the floor type, and wherein the supporting means is provided with an opening in registry with the first named opening to also receive the bow of the padlock whereby the latter locks the gear shift mechanism against operation and also blocks connection of the lever to the supporting means.

8. A device for preventing operation of the gear shifting mechanism of a motor vehicle in accordance with claim 1, wherein the key-controlled means consists of a padlock.

9. A device for preventing operation of the gear shifting mechanism of a motor vehicle in accordance with claim 1, wherein there is means to releasably latch the lever to the supporting means.

10. A device for preventing operation of the gear shifting mechanism of a motor vehicle in accordance with claim 1, wherein the key controlled means when in locked position simultaneously effects locking of the gear shift mechanism.

11. A gear shift device for the gear shifting mechanism of a motor vehicle composed of supporting means for connection to the operating means of the gear shift mechanism to actuate the latter, a lever, means to detachably connect the lever to the supporting means, and key controlled means carried by said supporting means and having a part incorporated therewith and movable to lie in the path of movement of the lever in connecting the latter to the supporting means to block connection of the lever to the supporting means when the key actuated means is in locked position, and which part of the key controlled means upon unlocking is movable out of the path of the lever to permit the latter to be connected to the supporting means.

12. A device for preventing operation of the gear shifting mechanism of a motor vehicle composed of a keeper for connection to the operating means of the gear shift mechanism to move therewith and thereby actuate same, a member substantially conforming in shape to and slidably engaged with the keeper, a handle carried by said member and disposed at substantially right angles thereto, key controlled means having a part thereof movable in one direction to block movement of the handle carrying member into the keeper, when said movable part is locked by the key controlled means and movable in a second direction when said movable part is unlocked to unblocking position by and upon movement of the handle carrying member into the keeper, and means to connect the key controlled means to a part of the vehicle in a position to lie adjacent to the keeper.

13. A device for preventing operation of the gear shifting mechanism of a motor vehicle of the type wherein the gear shift is operated by a horizontal handle disposed below the steering wheel, including keeper means for connection to a part of the gear shift to actuate the gear shift, a handle for horizontal disposition below the steering wheel, means to detachably connect the second named handle to the keeper means, and key controlled means which in one position thereof blocks connection of the second named handle to the keeper means.

14. A gear shift lock in accordance with claim 13, wherein there is means actuated by the key controlled means which upon movement of the latter to blocking position simultaneously effects locking of the gear shift.

15. An attachment for preventing operation of the gear shifting mechanism of a motor vehicle composed of a keeper for connection to the operating means of the gear shift mechanism to actuate the latter, a hand operated lever, means to detachably connect the lever to the keeper, key controlled means having a part formed to lie within the keeper to block connection of the lever to the keeper when the key controlled means is in locked position, and means cooperable with the key controlled means which upon movement of the latter to lever blocking position simultaneously effects locking of the gear shifting mechanism.

PAUL J. DORR.